United States Patent
Kang et al.

(10) Patent No.: US 12,549,805 B2
(45) Date of Patent: Feb. 10, 2026

(54) ELECTRONIC APPARATUS, SERVER APPARATUS AND CONTROL METHOD THEREOF

(71) Applicant: Samsung Electronics Co., Ltd., Suwon-si (KR)

(72) Inventors: Wooseok Kang, Suwon-si (KR); Doohyun Kim, Suwon-si (KR); Minho Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 105 days.

(21) Appl. No.: 18/449,993

(22) Filed: Aug. 15, 2023

(65) Prior Publication Data

US 2024/0137606 A1 Apr. 25, 2024
US 2024/0236409 A9 Jul. 11, 2024

Related U.S. Application Data

(63) Continuation of application No. PCT/KR2023/009430, filed on Jul. 4, 2023.

(30) Foreign Application Priority Data

Oct. 25, 2022 (KR) ........................ 10-2022-0138550

(51) Int. Cl.
H04N 21/44 (2011.01)
H04N 21/442 (2011.01)

(52) U.S. Cl.
CPC ... H04N 21/44004 (2013.01); H04N 21/4424 (2013.01)

(58) Field of Classification Search
CPC ............... H04N 21/44004; H04N 21/4424
See application file for complete search history.

(56) References Cited

U.S. PATENT DOCUMENTS 7,016,970 B2 * 3/2006 Harumoto ............. H04L 47/263
709/219
7,647,614 B2 * 1/2010 Krikorian ............. H04L 65/756
725/87

(Continued)

FOREIGN PATENT DOCUMENTS

JP 2005-033732 2/2005
KR 10-2008-0087048 9/2008

(Continued)

OTHER PUBLICATIONS

Search Report and Written Opinion dated Oct. 12, 2023 issued in International Patent Application No. PCT/KR2023/009430.

*Primary Examiner* — Mulugeta Mengesha
(74) *Attorney, Agent, or Firm* — Nixon & Vanderhye, P.C.

(57) ABSTRACT

Disclosed is an electronic apparatus. The electronic apparatus includes: a communication interface comprising communication circuitry, a display, a memory configured to store at least one instruction, and one or more processors connected to the communication interface, the display, and the memory and configured to control the electronic apparatus, wherein the one or more processors, by executing the at least one instruction, may be configured to: control the display to display content streamed from an external server through the communication interface, based on receiving delay characteristic information corresponding to the streamed content from the external server, identify a critical value of a stream buffer in which the streamed content is stored based on the delay characteristic information, and control at least one of a decoding speed of the content or output speed of the display based on the critical value of the stream buffer and a state of the stream buffer.

12 Claims, 16 Drawing Sheets

(56) References Cited

U.S. PATENT DOCUMENTS

| | | | |
|---|---|---|---|
| 9,380,096 B2 | 6/2016 | Luby et al. | |
| 10,171,543 B2 | 1/2019 | Lee et al. | |
| 2010/0312905 A1 | 12/2010 | Sandmann et al. | |
| 2013/0007814 A1* | 1/2013 | Cherian | H04L 65/756 |
| | | | 725/62 |
| 2013/0128953 A1* | 5/2013 | Sonoda | H04N 19/44 |
| | | | 375/240.02 |
| 2015/0288737 A1* | 10/2015 | Lee | H04L 65/80 |
| | | | 709/231 |
| 2019/0319998 A1 | 10/2019 | Wee et al. | |
| 2020/0274817 A1* | 8/2020 | Kemmochi | H04N 21/439 |

FOREIGN PATENT DOCUMENTS

| | | |
|---|---|---|
| KR | 20120015037 A | 2/2012 |
| KR | 10-2015-0116220 | 10/2015 |
| KR | 101718127 B1 | 3/2017 |
| KR | 10-2019-0119696 | 10/2019 |
| KR | 10-2022-0030736 | 3/2022 |
| KR | 20220088095 A | 6/2022 |
| WO | 2005/122025 | 12/2005 |

\* cited by examiner

ELECTRONIC APPARATUS, SERVER APPARATUS AND CONTROL METHOD THEREOF

CROSS-REFERENCE TO RELATED APPLICATIONS

This application is a continuation of International Application No. PCT/KR2023/009430 designating the United States, filed on Jul. 4, 2023, in the Korean Intellectual Property Receiving Office and claiming priority to Korean Patent Application No. 10-2022-0138550, filed on Oct. 25, 2022, in the Korean Intellectual Property Office, the disclosures of each of which are incorporated by reference herein in their entireties.

BACKGROUND

Field

The disclosure relates to an electronic apparatus and a method of controlling thereof and, for example, to an electronic apparatus receiving streaming contents, a server apparatus streaming contents, and a method of controlling thereof.

Description of Related Art

Broadcasting and over-the-top (OTT), cloud game, mirroring service, and the like are services in a form of transmitting a compressed video stream from a system performing a role of a server to a client system and displaying the video stream to a user. A client may receive data and requirements from a user and transmit the same to a server, and the server may provide a service in accordance with the received user data.

SUMMARY

An electronic apparatus according to an example embodiment includes: a communication interface comprising circuitry, a display, a memory configured to store at least one instruction, and one or more processors connected to the communication interface, the display, and the memory and configured to control the electronic apparatus, wherein the one or more processors, by executing the at least one instruction, may be configured to: control the display to display content streamed from an external server through the communication interface based on receiving delay characteristic information corresponding to the streamed content from the external server, identify a critical value of a stream buffer in which the streamed content is stored based on the delay characteristic information, and control at least one of a decoding speed of the content or output speed of the display based on the critical value of the stream buffer and a state of the stream buffer.

According to an example embodiment, the one or more processors may be configured to: identify at least one of a minimum critical value or a maximum critical value of the stream buffer based on the received delay characteristic information based on identifying that the stream stored in the stream buffer is less than the minimum critical value, control at least one of a frame output speed, frame interpolation or frame repetition output based on an output buffer state and an output mode. In addition, the one or more processors may, based on identifying that stream stored in the stream buffer exceeds the maximum critical value, be configured to: control at least one of a frame output speed, frame output skip, or frame interpolation skip based on the output buffer state and the output mode. The output mode may include at least one or a variable refresh rate (VRR) mode, frame rate control (FRC) mode, or normal mode.

According to an example embodiment, the one or more processors may, based on identifying that the stream stored in the stream buffer is less than a minimum critical value, be configured to: identify a remaining spatial size of the output buffer, identify a number and position of a frame to be added to the output buffer based on the identified spatial size, and control at least one of a frame output speed, frame interpolation or frame repetition output based on the output mode and the identified number and position of the frame.

According to an example embodiment, the one or more processors may, based on identifying that stream stored in the stream buffer exceeds the maximum threshold value, be configured to: compare the maximum output speed of the display, maximum decoding speed of a decoder, and video frequency of the content, and control the communication interface to transmit an encoding control request to the external server based on a comparison result, or control at least one of a frame output speed, frame output skip or frame interpolation skip based on the information about the output mode and position and number of a frame to be skipped.

According to an example embodiment, the one or more processors may, based on identifying that, as a result of the comparison, the maximum output speed of the display is greater than the video frequency of the content and the maximum decoding speed of the decoder is greater than the video frequency of the content, be configured to: identify a remaining space size of the output buffer, identify decoding speed, output speed of the display, and position and number of frames to be skipped based on the output mode and the identified spatial size, and control at least one of the frame output speed, frame output skip or frame interpolation skip depending on whether adjustment of at least one of the decoding speed or the output speed of the display is possible.

According to an example embodiment, the one or more processors may, based on adjustment of at least one of the decoding speed or the output speed of the display being possible, be configured to: control the frame output speed based on the output mode or control frame interpolation skip, and based on adjustment of at least one of the decoding speed or the output speed of the display being impossible, control the communication interface to transmit, to the external server, an encoding control request comprising information about a frame to be skipped during encoding to control the frame output skip. The one or more processors may, based on identifying at least one that, as a result of the comparison, the maximum output speed of the display is less than video frequency of the content and the maximum decoding speed of the decoder is less than video frequency of the content, be configured to control the communication interface to transmit, to the external server, the encoding control request comprising information on a frame to be skipped during encoding.

According to an example embodiment, the one or more processors may, based on transmitting the encoding control request to the external server, based on receiving, from the server, a control response comprising information about whether decoding skip is performed and position information of a frame to which skip is performed, be configured to control a decoding operation about the streamed content based on the information included in the received control response.

According to an example embodiment, a server apparatus includes: a communication interface comprising circuitry, a memory configured to store at least one instruction, and one or more processors connected to the communication interface and the memory and configured to control the electronic apparatus, wherein the one or more processors, by executing the at least one instruction, may be configured to: stream content to a client apparatus through the communication interface, transmit, to the client apparatus, delay characteristic information related to the streamed content through the communication interface, based on receiving an encoding control request comprising information about a frame to be skipped during encoding from the client apparatus identify whether a streaming mode is a unicast mode or a broadcast mode, control an encoding operation based on information included in the encoding control request and the encoding mode according to the streaming mode, and transmit a control request for the encoding control request to the client apparatus through the communication interface.

According to an example embodiment, the one or more processors may be configured to: adjust at least one of a resolution or a bit rate of the streaming content based on frequency of the encoding control request or a number of frames to be skipped during encoding included in the encoding control request.

According to an example embodiment, a method of controlling an electronic apparatus may include: displaying content streamed from an external server, based on receiving delay characteristic information corresponding to the streamed content from the external server, identifying a critical value of a stream buffer in which the streamed content is stored based on the delay characteristic information, and controlling at least one of a decoding speed of the content or output speed of the display based on the critical value of the stream buffer and a state of the stream buffer.

According to an example embodiment, the method of controlling the server apparatus may include: streaming content to a client apparatus, transmitting delay characteristic information related to the streamed content through the communication interface to the client apparatus, based on receiving an encoding control request comprising information about a frame to be skipped during encoding from the client apparatus, identifying whether a streaming mode is a unicast mode or a broadcast mode, controlling an encoding operation based on information included in the encoding control request and the encoding mode according to the streaming mode, and transmitting a control request for the encoding control request to the client apparatus through the communication interface.

According to an example embodiment, a non-transitory computer readable medium storing computer instructions that, when executed, cause the electronic apparatus to perform an operation, the operation may include: displaying content streamed from an external server, based on receiving delay characteristic information corresponding to the streamed content from the external server, identifying a critical value of a stream buffer in which the streamed content is stored based on the delay characteristic information, and controlling at least one of a decoding speed of the content or output speed of the display based on the critical value of the stream buffer and a state of the stream buffer.

According to an example embodiment, a non-transitory computer readable medium storing computer instructions that, when executed, cause the electronic apparatus to perform an operation, wherein the operation may include: streaming content to a client apparatus, transmitting delay characteristic information related to the streamed content through the communication interface to the client apparatus, based on receiving an encoding control request comprising information about a frame to be skipped during encoding from the client apparatus, identifying whether a streaming mode is a unicast mode or a broadcast mode, controlling an encoding operation based on information included in the encoding control request and the encoding mode according to the streaming mode, and transmitting a control request for the encoding control request to the client apparatus through the communication interface.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
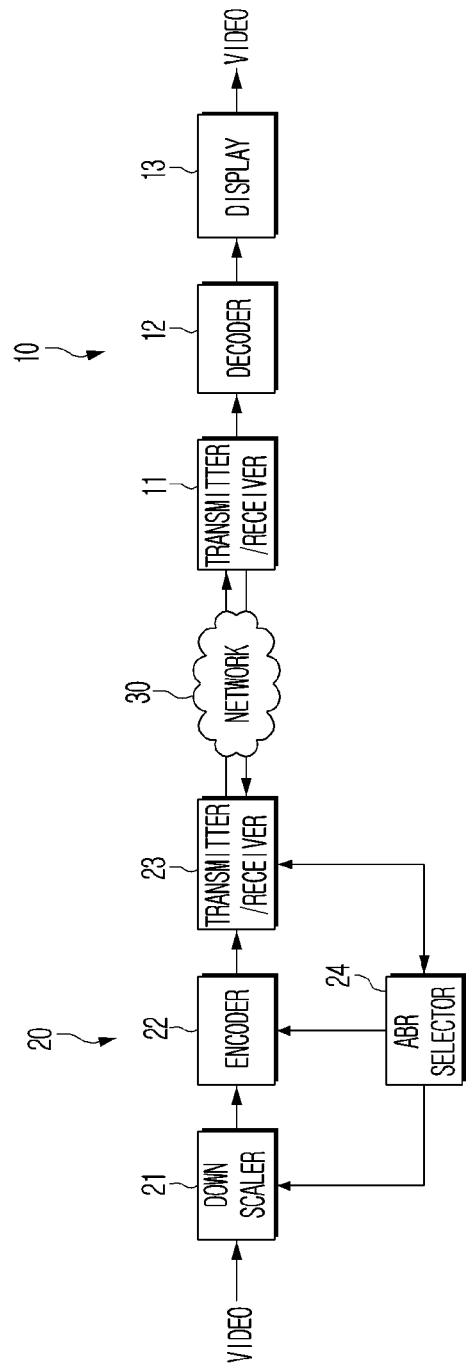
FIG. 1 is a block diagram illustrating an example configuration of a real-time video streaming system according to various embodiments.

Terms used in the disclosure will be briefly described, and then various example embodiments will be described in greater detail.

The terms used in the disclosure and the claims are general terms identified in consideration of the functions of embodiments of the disclosure. However, these terms may vary depending on intention, legal or technical interpretation, emergence of new technologies, and the like of those skilled in the related art. In addition, in some cases, a term may be arbitrarily selected, in which case the term will be described in detail in the description of the corresponding disclosure. Thus, the term used in this disclosure should be defined based on the meaning of term, not a simple name of the term, and the contents throughout this disclosure.

Expressions such as "have," "may have," "include," "may include" or the like represent presence of corresponding numbers, functions, operations, or parts, and do not exclude the presence of additional features.

In this disclosure, expressions such as "at least one of A [and/or] B," or "one or more of A [and/or] B," include all possible combinations of the listed items. For example, "at least one of A and B," or "at least one of A or B" includes any of (1) at least one A, (2) at least one B, or (3) at least one A and at least one B.

As used herein, terms such as "first," and "second," may identify corresponding components, regardless of order and/or importance, and are used to distinguish a component from another without limiting the components.

In addition, a description that one element (e.g., a first element) is operatively or communicatively coupled with/to" or "connected to" another element (e.g., a second element) should be interpreted to include both the first element being directly coupled to the second element, and the first element being indirectly coupled to the second element through a third element.

The expression "configured to" used in the disclosure may be interchangeably used with other expressions such as "suitable for," "having the capacity to," "designed to," "adapted to," "made to," and "capable of," depending on cases. Meanwhile, the term "configured to" does not necessarily refer to a device being "specifically designed to" in terms of hardware.

Instead, under some circumstances, the expression "a device configured to" may refer, for example, to the device being "capable of" performing an operation together with another device or component. For example, the phrase "a processor configured to perform A, B, and C" may refer, for example, to a dedicated processor (e.g., an embedded processor) for performing the corresponding operations, or a general-purpose processor (e.g., a central processing unit (CPU) or an application processor) that can perform the corresponding operations by executing one or more software programs stored in a memory device.

A singular expression includes a plural expression, unless otherwise specified. It is to be understood that the terms such as "comprise" or "consist of" are used herein to designate a presence of a characteristic, number, step, operation, element, component, or a combination thereof, and do not to preclude a presence or a possibility of adding one or more of other characteristics, numbers, steps, operations, elements, components or a combination thereof.

The term such as "module," "unit," "part," and so on may be used to refer to an element that performs at least one function or operation, and such element may be implemented as hardware or software, or a combination of hardware and software. Further, except for when each of a plurality of "modules," "units," "parts," and the like needs to be realized in an individual hardware, the components may be integrated in at least one module and may be realized in at least one processor (not shown).

It is understood that various elements and regions in the figures may be shown out of scale. Accordingly, the scope of the disclosure is not limited by the relative sizes or spacing drawn from the accompanying drawings.

Hereinafter, with reference to the attached drawings, various example embodiments will be described in greater detail.

FIG. 1 is a diagram illustrating an example configuration of a real-time video streaming system according to various embodiments.

According to various embodiments of FIG. 1, a real-time video streaming system may include a client apparatus 10 and a server apparatus 20.

In order to stream high-definition/high-resolution images such as 4K, 8K, etc. via a network 30, an image encoding technology capable of reducing a network requirement bandwidth and an up/down scaling technology are important. In the video encoding technology, a standard codec such as H.264/265, VP8/9, AV1 is widely used, and in the case of an OTT company, a 4K video is compressed up to about 15 Mbps based on H.265 specification. In order to provide services for different network environments of users, compression with various combinations of video resolutions and transmission rates is necessary, and here up/down scaling technology is used. For example, when an 8K video is to be transmitted at a level of about 15 Mbps, the server apparatus 20 may downscale the video and encode the downscaled video and transmit the encoded video to the client apparatus 10. In this case, the server apparatus 20 may include a downscaler 21 for downscaling a video, an encoder 22 for encoding the video, and a transmitter/receiver 23 for transmitting the encoded video to the client apparatus 10.

In the case of a real-time video streaming service according to an example, the server apparatus 20 may downscale and encode a video (or an image) in real time based on a resolution and/or a compression bitrate selected in real time by an average efficient bit rate (ABR) selector 24. For example, the real-time video streaming service may include a live broadcast service, a cloud game service, a mirroring service, a video call service, and the like. Here, the average bit rate (ABR) may refer, for example, to a method for setting a target bit rate and performing encoding by changing a bit rate according to a target bit rate. The ABR may be a compression method in which characteristics of CBR and VBR are mixed in that a capacity of a video to be completed may be predicted like a constant bit rate (CBR) method while bit rates are changing in accordance with the set value like variable bit rate (VBR).

The client apparatus 10 may decode the video received from the server apparatus 20 via the network 30 and display the decoded video. In addition, the client apparatus 10 may upscale and display the decoded video if necessary. In this case, the client apparatus 10 may include a transmitter/receiver 11 for transmitting/receiving a video from the server apparatus 20, a decoder 12 for decoding the received video, and a display 13 for displaying the decoded video.

On the other hand, a network 30 through which a streaming service is provided may generate a deterioration situation such as a temporary transmission failure or a bandwidth reduction. According to the network situation, the server apparatus 20 may minimize and/or reduce service disconnection and delay by adjusting resolution and compression bit rate through ABR function.

In a non-real time service such as an OTT movie watching, a temporary pause may occur when a transmission delay occurs in a situation such as a network deterioration or a temporary failure of the client apparatus 10 and/or the server apparatus 20, but a service may be performed without a problem by continually streaming the content after the occurrence of pause.

On the other hand, when streaming is performed in the same manner as a non-real-time service in a network deterioration situation in a real-time streaming service, delay is accumulated whenever a transmission delay occurs, so that a real-time service cannot be properly performed. Therefore, when a transmission delay occurs, a delayed amount of content needs to be discarded and the latest content needs to be serviced, so that a delay is not accumulated. For example, since the compression encoding is batch-processed in units of groups of pictures (GOP) having dependency between frames, when a delay occurs, it is possible to discard the previous content, and decode and display the latest content at the time when a new GOP starts. Therefore, the delay may be accumulated until at least one GOP ends, and thus a large delay may occur. When the GOP is set to be small, the delay accumulation may be reduced, but an intra frame, which is the start of the GOP, is frequently generated so that deterioration in image quality may occur, and if the GOP is set to be large, in a situation where the content with accumulated delay is discarded and a new GOP is displayed, the content may be disconnected and service quality may be damaged. Here, the GOP may refer to an image data unit that includes a group of front and rear screen data of a few frames.

Accordingly, various embodiments for minimizing and/or reducing a transmission delay while maintaining quality according to a network state and content characteristics in a low-delay streaming service such as real-time streaming and when a delay occurs, restoring to a minimum delay situation within a short time as possible will be described in greater detail below with reference to the figures.

Figure 2A:
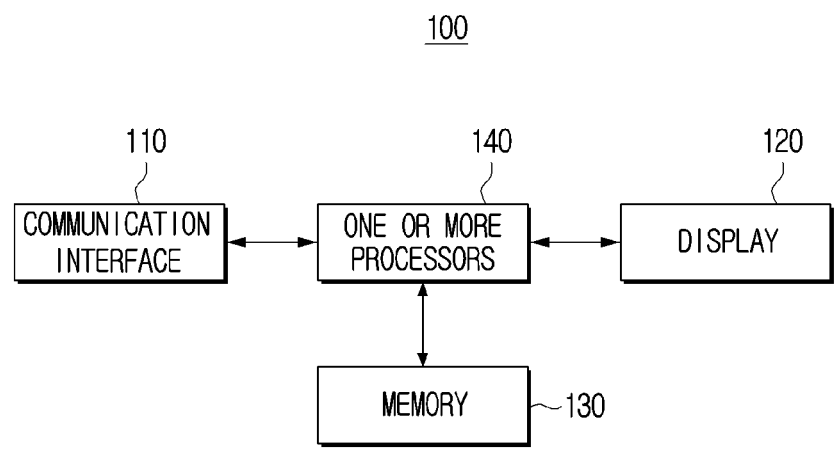
FIG. 2A is a block diagram illustrating an example configuration of an electronic apparatus according to various embodiments.

FIG. 2A is a block diagram illustrating an example configuration of an electronic apparatus according to various embodiments.

Referring to FIG. 2A, the electronic apparatus 100 includes the communication interface (e.g., including communication circuitry) 110, the display 120, the memory 130, and one or more processors (e.g., including processing circuitry) 140.

The communication interface 110 may include various communication circuitry and support various communication methods according to various embodiments of the electronic apparatus 100. For example, the communication interface 110 may communicate with an external device, an external storage medium (for example, a universal serial bus (USB) memory), an external server (for example, a cloud server) through communication methods such as, for example, and without limitation, Bluetooth, an access point (AP)-based Wi-Fi (wireless LAN network), Zigbee, wired/wireless local area network (LAN), wide area network (WAN), Ethernet, IEEE 1394, high definition multimedia interface (HDMI), universal serial bus (USB), mobile high-definition link (MHL), advanced encryption standard (AES)/European broadcasting union (EBU), optical, coaxial, or the like.

The display 120 may be implemented as a display including a self-emitting element or a display including a non-self-limiting element and a backlight. For example, the display 120 may be implemented as a display of various types such as, for example, and without limitation, a liquid crystal display (LCD), organic light emitting diodes (OLED) display, light emitting diodes (LED), micro LED, mini LED, plasma display panel (PDP), quantum dot (QD) display, quantum dot light-emitting diodes (QLED), or the like. In the display 120, a backlight unit, a driving circuit which may be implemented as an a-si TFT, low temperature poly silicon (LTPS) TFT, organic TFT (OTFT), or the like, may be included as well. According to various embodiments, a touch sensor having a type of a touch film, a touch sheet, a touch pad, or the like, for sensing a touch operation is arranged on the front surface of the display 120 to sense various types of touch inputs. For example, the display 120 may sense various types of touch inputs such as a touch input by a user hand, a touch input by an input device such as a stylus pen, a touch input by a specific electrostatic material, and the like. Here, the input device may be implemented as a pen-type input device which may be referred to as various terms, such as an electronic pen, a stylus pen, an S-pen, and the like. According to various embodiments, the display 120 may be implemented as a flat display, a curved display, a folding and/or rolling flexible display, and the like.

The memory 130 may store data necessary for various embodiments of the disclosure. The memory 130 may be implemented as a memory embedded in an electronic apparatus 100', or may be implemented as a removable or modular memory in the electronic apparatus 100, according to the data usage purpose. For example, data for driving the electronic apparatus 100 may be stored in a memory embedded in the electronic apparatus 100', and data for an additional function of the electronic apparatus 100 may be stored in the memory detachable to the electronic apparatus 100. A memory embedded in the electronic apparatus 100 may be a volatile memory such as a dynamic random access memory (DRAM), a static random access memory (SRAM), a synchronous dynamic random access memory (SDRAM), or a nonvolatile memory (for example, one time programmable ROM (OTPROM), programmable ROM (PROM), erasable and programmable ROM (EPROM), electrically erasable and programmable ROM (EEPROM), mask ROM, flash ROM, a flash memory (for example, NAND flash or NOR flash), a hard disk drive or a solid state drive (SSD), or the like. In the case of a memory detachably mounted to the electronic apparatus 100', the memory may be implemented as a memory card (for example, a compact flash (CF), secure digital (SD), micro secure digital (micro-SD), mini secure digital (mini-SD), extreme digital (xD), multi-media card (MMC), etc.), an external memory (for example, a USB memory) connectable to the USB port, or the like, but the memory is not limited thereto.

The one or more processors 140 may include various processing circuitry and control overall operations of the electronic apparatus 100. For example, the one or more processors 140 may be electrically connected to each configuration of the electronic apparatus 100 and control overall operations of the electronic apparatus 100. For example, one or more processors 140 may be electrically connected to the display 120 and the memory 130 and may control overall operations of the electronic apparatus 100. The one or more processors may include one or a plurality of processors.

The one or more processors 140 may perform an operation of the electronic apparatus 100 according to various embodiments by executing at least one instruction stored in the memory 130.

One or more processors 140 may include one or more of a Central Processing Unit (CPU), a Graphics Processing Unit (GPU), an Accelerated Processing Unit (APU), a Many Integrated Core (MIC), a Digital Signal Processor (DSP), a Neural Processing Unit (NPU), a hardware accelerator, or a machine learning accelerator. The one or more processors 140 may control one or any combination of other components of the electronic apparatus and may perform operations or data processing relating to the communication. The one or more processors 140 may execute one or more programs or instructions stored in the memory. For example, one or more processors may perform a method in accordance with various embodiments of the disclosure by executing one or more instructions stored in a memory.

When a method according to various embodiments of the disclosure includes a plurality of operations, a plurality of operations may be performed by one processor or may be performed by a plurality of processors. For example, when a first operation, a second operation, and a third operation are performed by a method according to various embodiments, all of the first operation, the second operation, and the third operation may be performed by the first processor, the first operation and the second operation may be performed by a first processor (e.g., a general purpose processor), and the third operation may be performed by a second processor (e.g., an artificial intelligence dedicated processor).

The one or more processors 140 may be implemented as a single core processor including one core, or may be implemented as one or more multicore processors including a plurality of cores (for example, homogeneous multi-cores or heterogeneous multi-cores). When the one or more processors 140 are implemented as a multi-core processor, each of the plurality of cores included in the multi-core processor may include a processor internal memory such as a cache memory and an on-chip memory, and a common cache shared by the plurality of cores may be included in the multi-core processor. In addition, each of a plurality of cores (or a part of a plurality of cores) included in the multi-core processor may independently read and perform a program command for implementing a method according to various embodiments of the disclosure, and may read and perform a program command for implementing a method according to various embodiments of the disclosure in connection with all (or a part of) a plurality of cores.

When the method according to various embodiments of the disclosure includes a plurality of operations, the plurality of operations may be performed by one core among a plurality of cores included in the multi-core processor or may be performed by the plurality of cores. For example, when a first operation, a second operation, and a third operation are performed by a method according to various embodiments, all the first operation, second operation, and third operation may be performed by a first core included in the multi-core processor, and the first operation and the second operation may be performed by a first core included in the multi-core processor and the third operation may be performed by a second core included in the multi-core processor.

In various embodiments of the disclosure, the processor may refer, for example, to a system-on-chip (SoC), a single core processor, a multi-core processor, or a core included in a single core processor or a multi-core processor in which one or more processors and other electronic components are integrated, wherein the core may be implemented as a CPU, a GPU, an APU, a MIC, a DSP, an NPU, a hardware accelerator, or a machine learning accelerator, but embodiments of the disclosure are not limited thereto. Hereinafter, for convenience of description, one or more processors 140 are referred to as a processor 140.

Figure 2B:
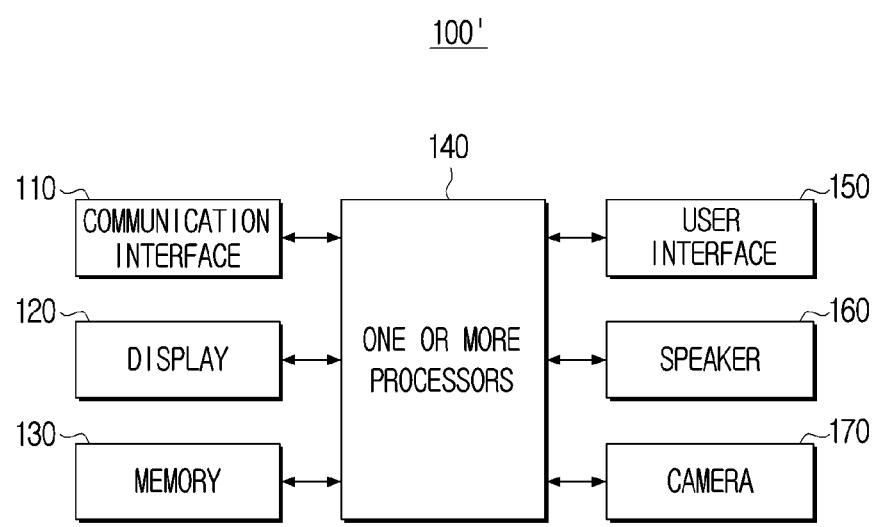
FIG. 2B is a block diagram illustrating an example configuration of an electronic apparatus according to various embodiments.

FIG. 2B is a block diagram illustrating an example configuration of an electronic apparatus according to various embodiments.

Referring to FIG. 2B, the electronic apparatus 100' may include the communication interface (e.g., including communication circuitry) 110, the display 120, the memory 130, one or more processors (e.g., including processing circuitry) 140, a user interface (e.g., including various interface circuitry) 150, a speaker 160, and a camera 170. The configurations of FIG. 2B overlapping with FIG. 2A may not be further described.

The user interface 150 may include various interface circuitry and be implemented as a device such as, for example, a button, a touch pad, a mouse, and a keyboard, or a touch screen capable of performing the above-described display function and operation input function, or the like.

The speaker 160 is configured to output various notification sounds or voice messages as well as audio data. The processor 140 may control a speaker to output information corresponding to the UI screen or various notifications in a form of audio according to various embodiments.

A camera 170 may perform capturing by being turned on according to a predetermined event. The camera 170 may convert the captured image into an electrical signal and generate image data based on the converted signal. For example, a subject may be converted into an electrical image signal through a charge coupled device (CCD) sensor, and the converted image signal may be converted into an amplified signal and a digital signal and then processed.

The electronic apparatus 100' may include a microphone (not shown), a sensor (not shown), a tuner (not shown), and a demodulator (not shown) according to various embodiments.

The microphone (not shown) is configured to receive user voice or other sound to convert the same to audio data. According to an embodiment, the electronic apparatus 100' may receive a user voice input through an external device through the communication interface 110.

The sensor (not shown) may include various types of sensors such as a touch sensor, a proximity sensor, an acceleration sensor, a geomagnetic sensor, a gyro sensor, a pressure sensor, a position sensor, an illuminance sensor, etc.

The tuner (not shown) may receive a radio frequency (RF) broadcast signal by tuning a channel selected by a user or all the prestored channels, among the RF broadcast signal received through an antenna.

The demodulator (not shown) may receive and demodulate a digital intermediate frequency (DIF) signal converted by the tuner and perform channel decoding, or the like.

According to various embodiments, the processor 140 may determine a control parameter value for processing content streamed based on delay characteristic information of content and may process content accordingly.

Figure 2C:
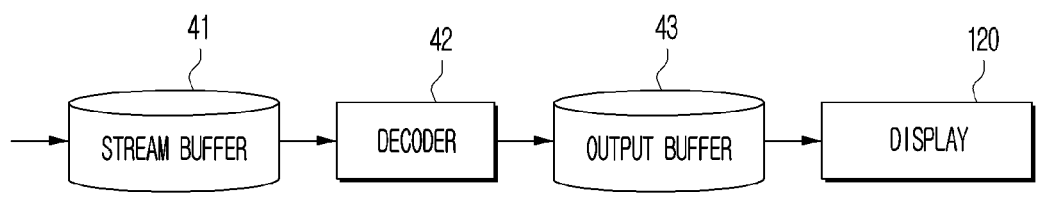
FIG. 2C is a diagram illustrating an example method of processing content of an electronic apparatus according to various embodiments.

FIG. 2C is a diagram illustrating an example method of processing content of an electronic apparatus according to various embodiments.

According to the embodiment illustrated in FIG. 2C, content streamed in real time to the electronic apparatus 100 may be stored in a stream buffer (or a reception buffer) 41. Here, the streamed content may be content encoded in an external server (refer, e.g., to FIGS. 1 and 20). Accordingly, the content stored in the stream buffer 41 may be provided to the decoder 42 and decoded, and the decoded content may be buffered in the output buffer 43 and output through the display 120. Here, the decoder 42 may be implemented in a type of DSP.

Figure 3:
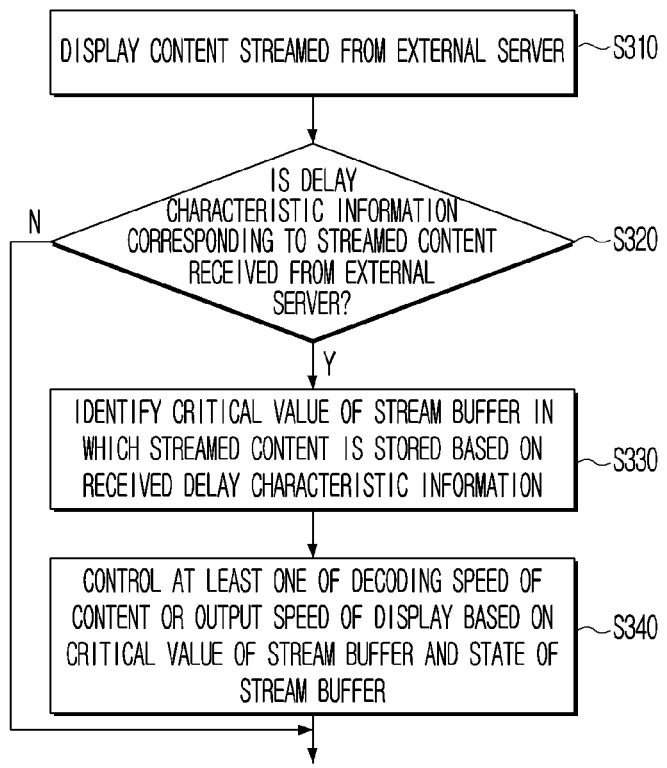
FIG. 3 is a flowchart illustrating an example method of controlling an electronic apparatus according to various embodiments.

FIG. 3 is a flowchart illustrating an example method of controlling an electronic apparatus according to various embodiments.

According to various embodiments of FIG. 3, the processor 140 may control the display 120 to display content streamed from the external server 20 (FIG. 1) through the communication interface 110 in operation S310.

Based on receiving delay characteristic information corresponding to the streamed content from the external server in operation S320:Y, the processor 140 may identify a critical value of a stream buffer in which the streamed content is stored based on the delay characteristic information in operation S330.

The delay characteristic information may be information identified based on a characteristic of the content (or source content). For example, when the content is classified into a type requiring which delay characteristic, a method such as classifying depending on an input source such as a game machine/set-top/BDP or using information stored in a content DB or directly analyzing an image. For example, even in one game content, there may be a part requiring a low delay, since the user is directly playing a game or a part not requiring low delay by focusing on appreciation, a classification may be changed for each chapter or scene.

According to an example, the server apparatus 20 may identify delay characteristic information based on characteristics of content (or source content). For example, the delay characteristic information may be information indicating only whether a low delay is required, information in which a level of low delay requirement is digitized, or level information that grades a low delay requirement. That is, the delay characteristic information may be various types of information capable of indicating a low delay request of the content.

The processor 140 may identify a critical value of the stream buffer based on the delay characteristic information of the content. For example, when it is identified that the delay characteristic information of the content allows a large delay, the processor 140 may increase the maximum critical value (or allowable maximum value) of the stream buffer to allow a large delay, but ensure stability. In this case, the server 20 may set a coding option for increasing image quality instead of increasing the delay of encoding.

In this example, in operation S340 the processor 140 may control at least one of the decoding speed of the content or output speed of the display 120 based on the critical value of the stream buffer identified in operation S330 and the state of the stream buffer.

Figure 4:
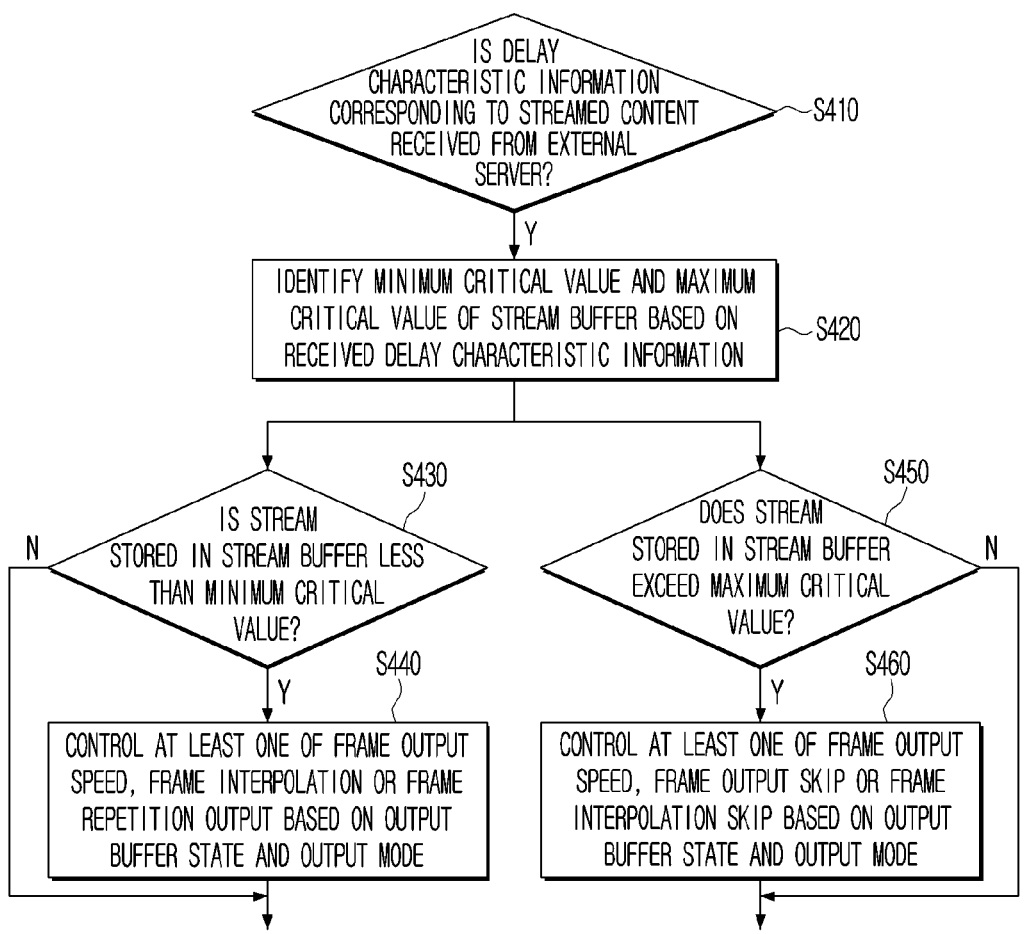
FIG. 4 is a flowchart illustrating an example method of controlling an electronic apparatus according to various embodiments.

FIG. 4 is a flowchart illustrating an example method of controlling an electronic apparatus according to various embodiments.

According to the embodiment illustrated in FIG. 4, when the delay characteristic information of the content is received from the external server 20 in operation S410, the processor 140 may identify a minimum critical value (or an allowable minimum value) and/or a maximum critical value (or an allowable maximum value) of the stream buffer based on the received delay characteristic information in operation S420. For example, if it is identified that the delay characteristic information of the content allows a large delay, the processor 140 may increase the maximum critical value of the stream buffer to allow a large delay but ensure stability. In this case, the server 20 may set a coding option for increasing image quality instead of increasing the delay of encoding.

According to an example, the processor 140 may identify the minimum critical value and/or the maximum critical value of the stream buffer in consideration of the network state as well as the delay characteristic information of the content. For example, when the network state change is severe, the minimum critical value and the maximum critical value of the stream buffer may be set to be relatively large. In addition, in the case of content having a low delay characteristic (for example, game content in which response speed with a user is very important), a minimum critical value, and a maximum critical value may be set to be relatively small. In addition, the processor 140 may down-scale and encode the video in real time based on a resolution and/or a compression bitrate selected in real time by an average bit rate (ABR).

Here, the network state information may include at least one of an available bandwidth of a network, a packet loss rate, a round-trip time of a packet, a delay-gradient of a packet, received signal strength indicator (RSSI) information, communication channel information, link speed information, channel interference information, or retry rate information. That is, the network state information may be various information related to networks affected by the congestion, distance, and transmission speed of the network. A round round-trip time (or round trip delay) of a packet may refer to a time taken for a packet to reciprocate from a network to a receiving end. A delay-gradient of a packet may be a difference between a transmission time interval of packets transmitted from a transmission end and a reception time interval of packets received at a reception end. The communication channel information may include information on at least one of a channel and a frequency. The link speed information may be information on a rate of packets transmitted from a transmitting end to a receiving end. The channel interference information may be obtained on the basis of an interference factor for each channel measured using various channel RF parameters such as channel active time, channel busy time, and channel transmit time. The retry rate information may indicate a percentage of a transmission packet that is retried in a unit of a second.

According to various embodiments, the processor 140 may calculate decoding speed of a decoder and/or output speed of the display 120 and/or output sequence based on the output buffer state and the output mode and may control the decoder and/or display 120 based thereon.

According to an example, if a stream stored in the stream buffer is identified as less than a minimum critical value in operation S430:Y, the processor 140 may control at least one of a frame output speed, frame interpolation, or frame repetition output based on the output buffer state and the output mode in operation S440. The output mode may include at least one or variable refresh rate (VRR) mode, frame rate control (FRC) modem, or normal mode.

Based on identifying that stream stored in the stream buffer in operation S450 exceeds the maximum critical value, the processor 140 may control at least one of the frame output speed, frame output skip or frame interpolation skip based on the output buffer state and the output mode in operation S460.

Figure 5:
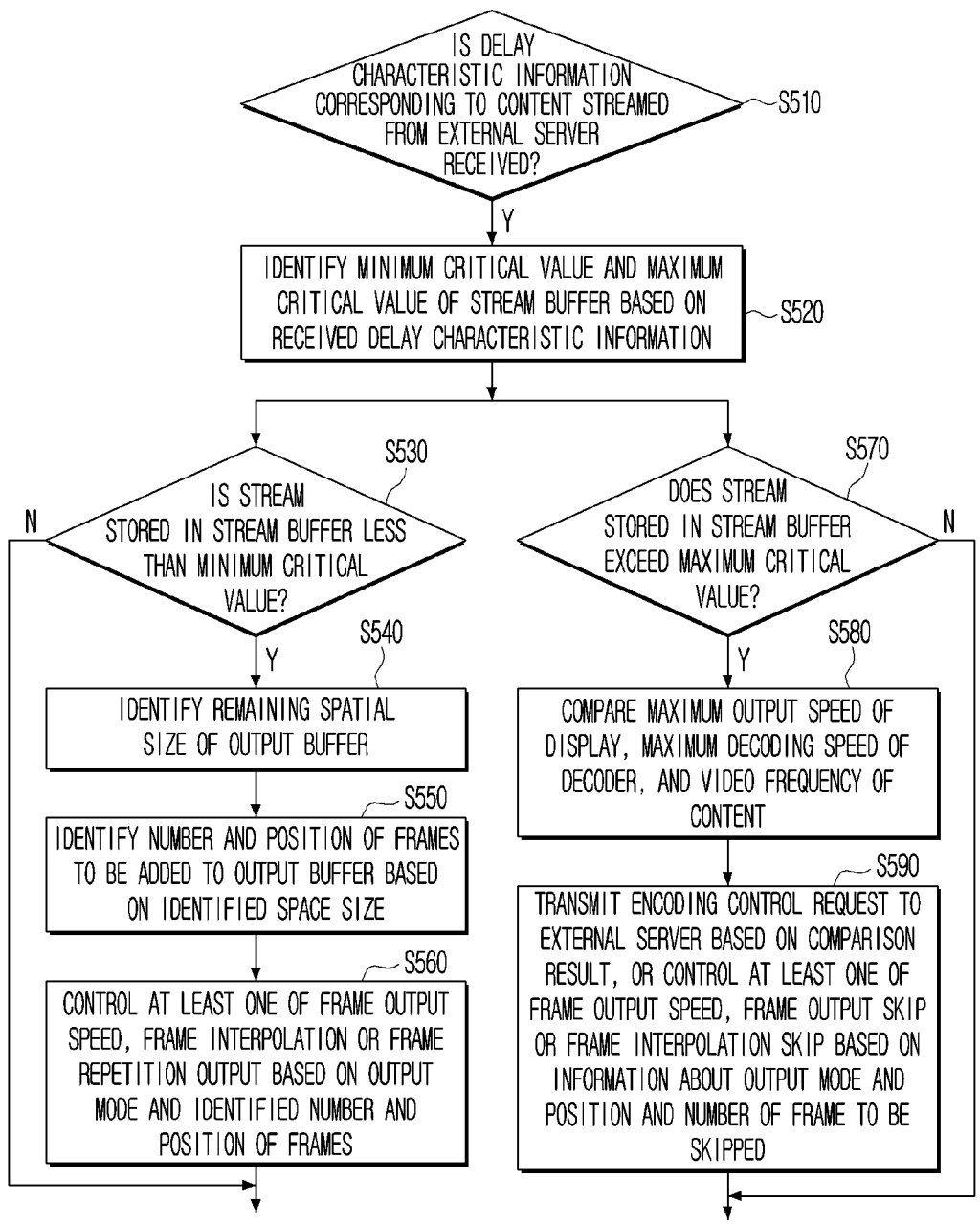
FIG. 5 is a flowchart illustrating an example method of controlling an electronic apparatus according to various embodiments.

FIG. 5 is a flowchart illustrating an example method of controlling an electronic apparatus according to various embodiments.

According to various embodiments of FIG. 5, the when the delay characteristic information of content is received from the external server 20 in operation S510, the processor 140 may identify a minimum critical value and/or maximum critical value of a stream buffer based on the received delay characteristic information in operation S520.

According to an example, the processor 140 may, based on identifying that the stream stored in the stream buffer is less than a minimum critical value in operation S530:Y, identify storage space size and/or remaining spatial size of the output buffer in operation S540.

The processor 140 may identify the number and position of a frame to be added to the output buffer based on the identified spatial size in operation S550.

In operation S560, the processor 140 may control at least one of a frame output speed, frame interpolation or frame repetition output based on the output mode of the display 110 and the number and position of the frame identified in operation S550. The output mode may include at least one of a variable refresh rate (VRR) mode, a frame rate control (FRC) mode and a normal mode.

The processor 140 may, based on identifying that stream stored in the stream buffer exceeds the maximum threshold value in operation S570:Y, compare the maximum output speed of the display, maximum decoding speed of a decoder, and video frequency of the content in operation S580. For example, the processor 140 may compare the maximum output speed of a display with video frequency of content and may compare the maximum decoding speed with video frequency of the content.

The processor 140 may transmit an encoding control request to the external server 20 based on a comparison result in operation S580, or control at least one of a frame output speed, frame output skip or frame interpolation skip based on the information about the output mode and position and number of a frame to be skipped in operation S590.

The processor 140 may, based on identifying that, as a result of the comparison of S580, the maximum output speed of the display 120 is greater than the video frequency of the content and the maximum decoding speed of the decoder is greater than the video frequency of the content, identify a remaining space size of the output buffer. Then, the processor 140 may identify decoding speed, output speed of the display 110, and position and number of frames to be skipped based on the output mode and the identified spatial size. The processor 140 may control at least one of the frame output speed, frame output skip or frame interpolation skip depending on whether adjustment of at least one of the decoding speed or the output speed of the display 110 is possible.

According to an example, the processor 140 may, based on adjustment of at least one of the decoding speed or the output speed of the display 120 being possible, control the frame output speed based on the output mode or control frame interpolation skip. Alternatively, the processor 140 may, based on adjustment of at least one of the decoding speed or the output speed of the display 110 being impossible, transmit, to the server 20, an encoding control request comprising information about a frame to be skipped during encoding to control the frame output skip.

According to various embodiments, the processor 140 may, based on identifying at least one that, as a result of the comparison of S580, the maximum output speed of the display is less than video frequency of the content and the maximum decoding speed of the decoder is less than video frequency of the content, transmit, to the server 20, the encoding control request comprising a frame to be skipped during encoding.

Meanwhile, after transmitting the encoding control request to the server 20, based on receiving, from the server 20, a control response comprising information about whether decoding skip is performed and position information of a frame to which skip is performed, the processor 140 may control a decoding operation about the streamed content based on the information included in the received control response.

Figure 6:
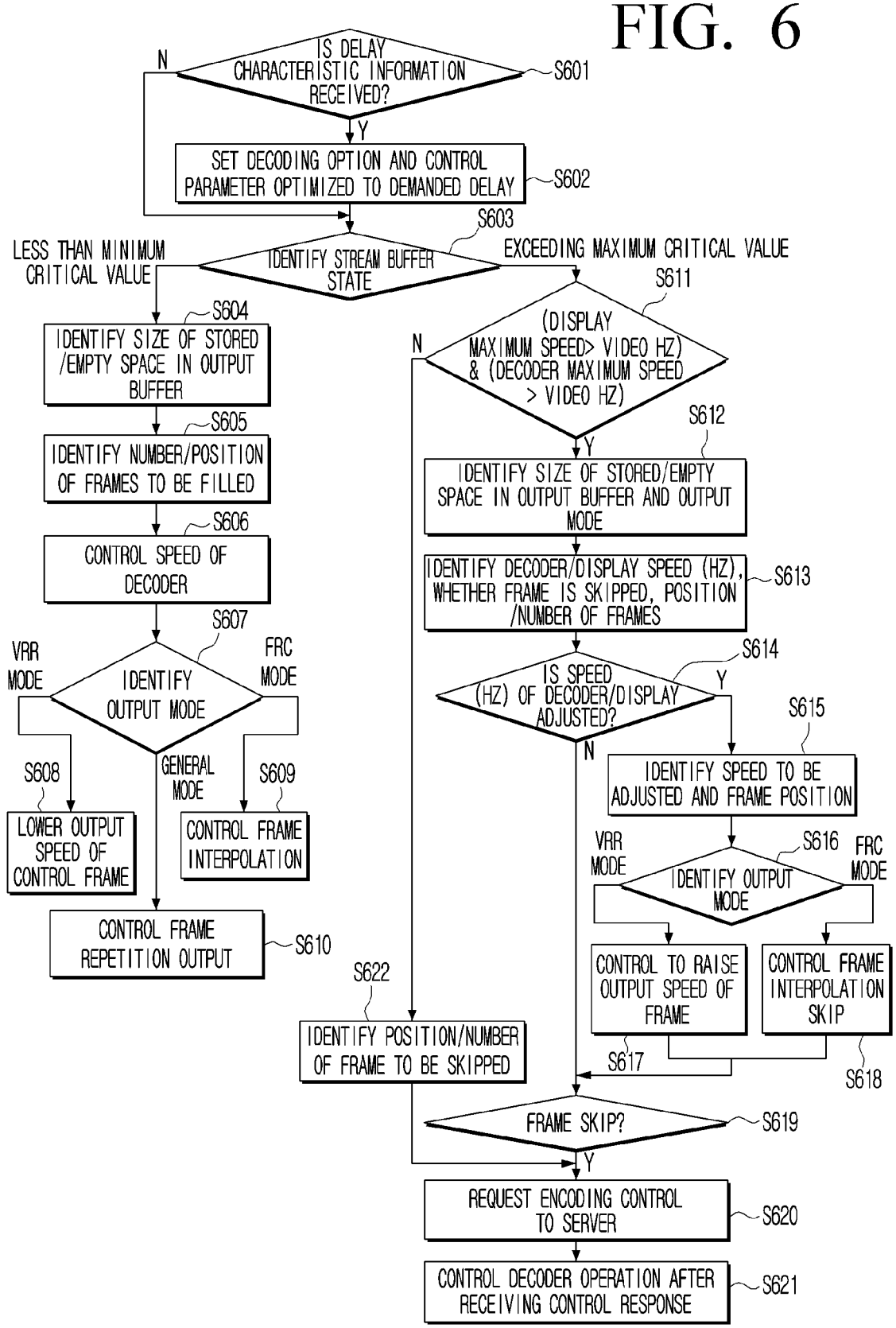
FIG. 6 is a flowchart illustrating an example method of controlling an electronic apparatus according to various embodiments.

FIG. 6 is a flowchart illustrating an example method of controlling an electronic apparatus according to various embodiments.

Referring to the embodiment of FIG. 6, when the delay characteristic information of the content is received from the external server 20 in operation S601, the processor 140 may set the decoding option and/or control parameter optimized for demanded delay based on the received delay characteristic information in operation S602. For example, the processor 140 may identify minimum critical value and/or maximum critical value of the stream buffer based on the delay characteristic information.

The processor 140 may identify the status of the stream buffer in operation S603. Here, the status of the stream buffer may refer, for example, to the size of stream stored in the stream buffer.

The processor 140 may, based on identifying that the stream stored in the stream buffer is less than a minimum critical value, identify prestored space size in the output buffer and/or remaining spatial size of the output buffer in operation S604.

The processor 140 may identify the number and position of a frame to be added, that is, filled, to the output buffer in operation S605.

In operation S606, the processor 140 may control speed of the decoder based on the number and position of frames identified in operation S605. Here, the speed control may include the decoder pause control.

The processor 140 may identify the output mode of the display 120 in operation S607.

When it is identified that the output mode of the display 120 is the VRR mode, the processor 140 may lower the decoding speed of the decoder and/or output speed of the display 120 as much as possible in operation S608. Accordingly, pause of screen due to transmission lack (or transmission delay) may be prevented and/or reduced.

When the output mode of the display 120 is identified as the FRC mode, the processor 140 may perform frame interpolation processing in operation S609.

The speed may be lowered by controlling to additionally generate interpolation frames in the middle, but detailed speed adjustment like VRR is not possible, so some screen pause or frame skip may occur.

When it is identified that the output mode of the display 120 does not support a general mode, that is, VRR and FRC, the processor 140 may control to repeatedly output a frame in operation S610. That is, the processor 140 may lower the display speed through frame repetition output.

Meanwhile, if it is identified that the stream size stored in the stream buffer exceeds the maximum critical value in operation S603, the processor 140 may identify whether the maximum output speed of the display 120 is greater than the video frequency of the content and the maximum decoding speed of the decoder is greater than the video frequency of the content in operation S611. Here, the case where the size of the stream stored in the stream buffer exceeds the maximum critical value may be the case where the streams, which were delayed after the transmission delay is generated, come rapidly and are accumulated in the buffer.

If it is identified that the maximum output speed of the display is greater than video frequency of content, and maximum decoding speed of decoder is greater than video frequency of content in operation S611:Y, the processor 140 may identify a prestored spatial size and/or remaining size of the output buffer and the output mode in operation S612.

In operation S613, the processor 140 may identify at least one of a decoding speed, an output speed of the display 120, whether a frame is skipped, a position of a frame to be skipped, and the number of frames to be skipped based on the output mode of the display 120 and the pre-stored spatial size of the output buffer and/or the remaining space size of the display 120 identified in operation S612. In this case, the processor 140 may identify frames to be quickly output through the decoding speed and the output speed of the display 120.

In the meantime, the processor 140 may identify whether at least one of the decoding speed or output speed of the display 120 is adjustable in operation S614.

If it is identified that at least one of the decoding speed or the output speed of the display 210 is adjustable in operation S614:Y, the processor 140 may identify the adjustment speed and the position of the target frame in operation S615 and identify the output mode of the display 120 in operation S616.

If it is identified that the output mode of the display 120 is the VRR mode, the processor 140 may raise the decoding speed of the decoder and/or output speed of the display 120 as high as necessary in operation S617. For example, the processor 140 may transmit a decoding speed control signal to the decoder and transmit a frame output speed control signal to the display 120. In this case, the control signal may include control speed information, the number of control target frames, position information, and the like.

If the output mode of the display 120 is identified as the FRC mode, the processor 140 may control frame interpolation skip process in operation S618. For example, the processor 140 may transmit a control signal for frame interpolation skip to the display 120. In this example, the control signal may include position information of a frame subject to interpolation skip.

In this case, frames that are not output even with a speed increase in a VRR mode and FRC mode, and frames remaining after being output at a maximum speed in a normal mode may occur due to execution speed limit of the decoder or display. To normalize the delay, these remaining frames need to be skipped and for this, a new frame compression stream that is not dependent with frames to be skipped by the decoder may be needed.

The processor 140 may transmit an encoding control request to the server 20 when there is a frame to be skipped S619:Y in operation S620. For example, the processor 140 may request a stream capable of decoding skip through an encoding control request. For example, the encoding control request may include information on the number of frames to be skipped. Thereafter, when a control response to the encoding control request is received from the server 20, the processor 140 may control the operation of the decoder on the basis of the received control response in operation S621. For example, the control response may include whether to skip the decoder determined by the server apparatus 200 and position information of the frames to which the skip is applied. For example, information on whether to skip a decoder may be transmitted through skip-flag.

In the meantime, when it is identified at least one of decoding speed or output speed of the display 210 is not adjustable in operation S614:N, the processor 140 may identify whether a frame to be skipped exists in operation S619.

When there is a frame to be skipped, the processor 140 may transmit an encoding control request to the server 20 in operation S620. For example, the encoding control request may include information on the number of frames to be skipped. Thereafter, when a control response to the encoding control request is received from the server 20, the processor 140 may control the operation of the decoder on the basis of the received control response in operation S621. For example, the control response may include whether or not to skip the decoder determined in the server 20 and position information of the frames to which the skip is applied. For example, information on whether to skip a decoder may be transmitted through skip-flag.

Meanwhile, if it is identified that the maximum output speed of the display 120 is less than or equal to the video frequency of the content or the maximum decoding speed of the decoder is less than or equal to the video frequency of the content in step S611:N, the processor 140 may identify the frame position and the number to be skipped in operation S622.

In operation S620, the processor 140 may transmit an encoding control request to the server 20 when the position and number of frames to be skipped are identified in operation S622. For example, the encoding control request may include information on the number of frames to be skipped. Thereafter, when a control response to the encoding control request is received from the server 20, the processor 140 may control the operation of the decoder on the basis of the received control response in operation S621. For example, the control response may include whether or not to skip the decoder determined in the server 20 and position information of the frames to which the skip is applied. For example, information on whether to skip a decoder may be transmitted through skip-flag.

Figure 7:
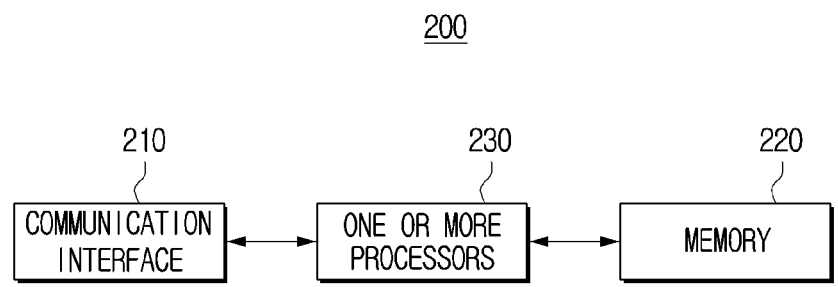
FIG. 7 is a block diagram illustrating an example configuration of a server apparatus according to various embodiments.

FIG. 7 is a block diagram illustrating an example configuration of a server apparatus according to various embodiments.

Referring to FIG. 7, the server apparatus 200 includes a communication interface (e.g., including communication circuitry) 210, a memory 220, and one or more processors (e.g., including processing circuitry) 230. According to an example, the server apparatus 200 may be implemented with the server 20 of FIG. 1.

The communication interface 210 may include various communication circuitry and support various communication methods according to various embodiments. For example, the communication interface 210 may communicate with an external device, e.g., electronic apparatus 100, through communication methods like an access point (AP)-based wireless fidelity (Wi-Fi) (wireless local area network (WLAN)), Zigbee, wired/wireless local area network (LAN), wide area network (WAN), Ethernet, IEEE 1394, high definition multimedia interface (HDMI).

The memory 220 may store data necessary for various embodiments. The implementation form of the memory 220 is the same as/similar to the implementation form of the memory 130 shown in FIG. 2A, and thus a detailed description thereof will be omitted.

The one or more processors 230 may include various processing circuitry and generally control the operation of the server apparatus 200. Specifically, the one or more processors 230 may be connected to each component of the server apparatus 200 to control the overall operation of the server apparatus 200. For example, the one or more processors 230 may be electrically connected to the memory 220 to control the overall operation of the server apparatus 200. The one or more processors 230 may be configured with one or a plurality of processors. The implementation form of the one or more processors 230 is the same as/similar to the implementation form of the one or more processors 140 illustrated in FIG. 2A, and thus a detailed description thereof will be omitted. Hereinafter, for convenience of description, one or more processors 230 are referred to as a processor 230.

Figure 8:
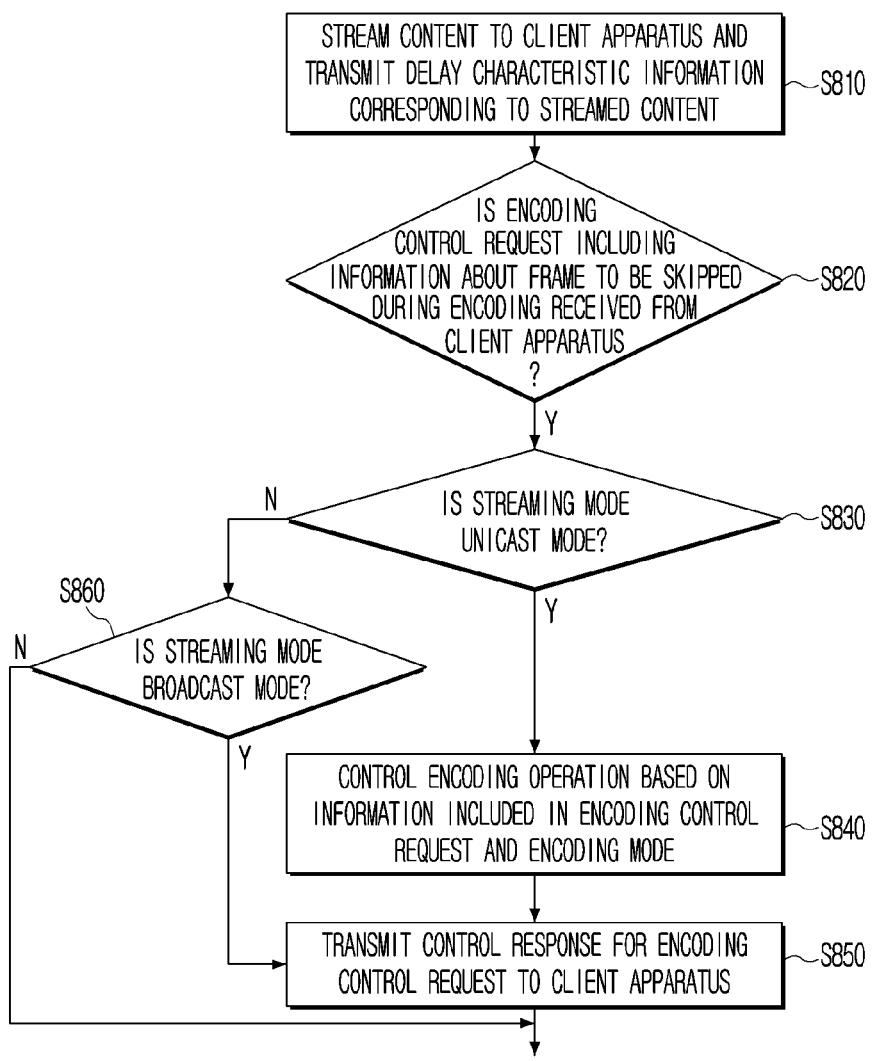
FIG. 8 is a flowchart illustrating an example method of controlling a server apparatus according to various embodiments.

FIG. 8 is a flowchart illustrating an example method of controlling a server apparatus according various embodiments.

According to the embodiment of FIG. 8, the processor 230 may stream the content to the electronic apparatus 100 through the communication interface 230 and may transmit the delay characteristic information corresponding to the streamed content in operation S810.

When an encoding control request including information about a frame to be skipped during encoding is received from a client apparatus (for example, the electronic apparatus 100) in operation S820:Y, the processor 230 may identify a streaming mode. Here, the encoding control request may include information on a frame to be skipped during encoding. For example, the encoding control request may include information on the number of frames to be skipped.

When the streaming mode is identified as the unicast mode in operation S830:Y, the processor 230 may control the encoding operation of the encoder based on the information included in the encoding control request and the encoding mode in operation S840.

Thereafter, the processor 230 may transmit a control response for the encoding control request to the client apparatus in operation S850. For example, the control response may include whether to perform skip by the decoder determined by the server apparatus 200 and position information of the frames to which the skip is applied. For example, information about whether to perform skip by the decoder may be transmitted through a skip-flag.

When the streaming mode is not identified as the unicast mode in operation S830:N, the processor 230 may identify whether the streaming mode is a broadcast mode (S860). When the streaming mode is identified as the broadcast mode in operation S860:Y, the processor 230 may transmit a control response for the encoding control request to the client apparatus in operation S850.

According to various embodiments, the processor 230 may adjust at least one of a resolution or a bit rate of the streaming content based on the frequency of the encoding control request or the number of frames to be skipped during encoding included in the encoding control request.

FIGS. 9, 10A, 10B, 10C and 10D include a flowchart and diagrams illustrating an example encoding operation of a server apparatus according to various embodiments.

Figure 9:
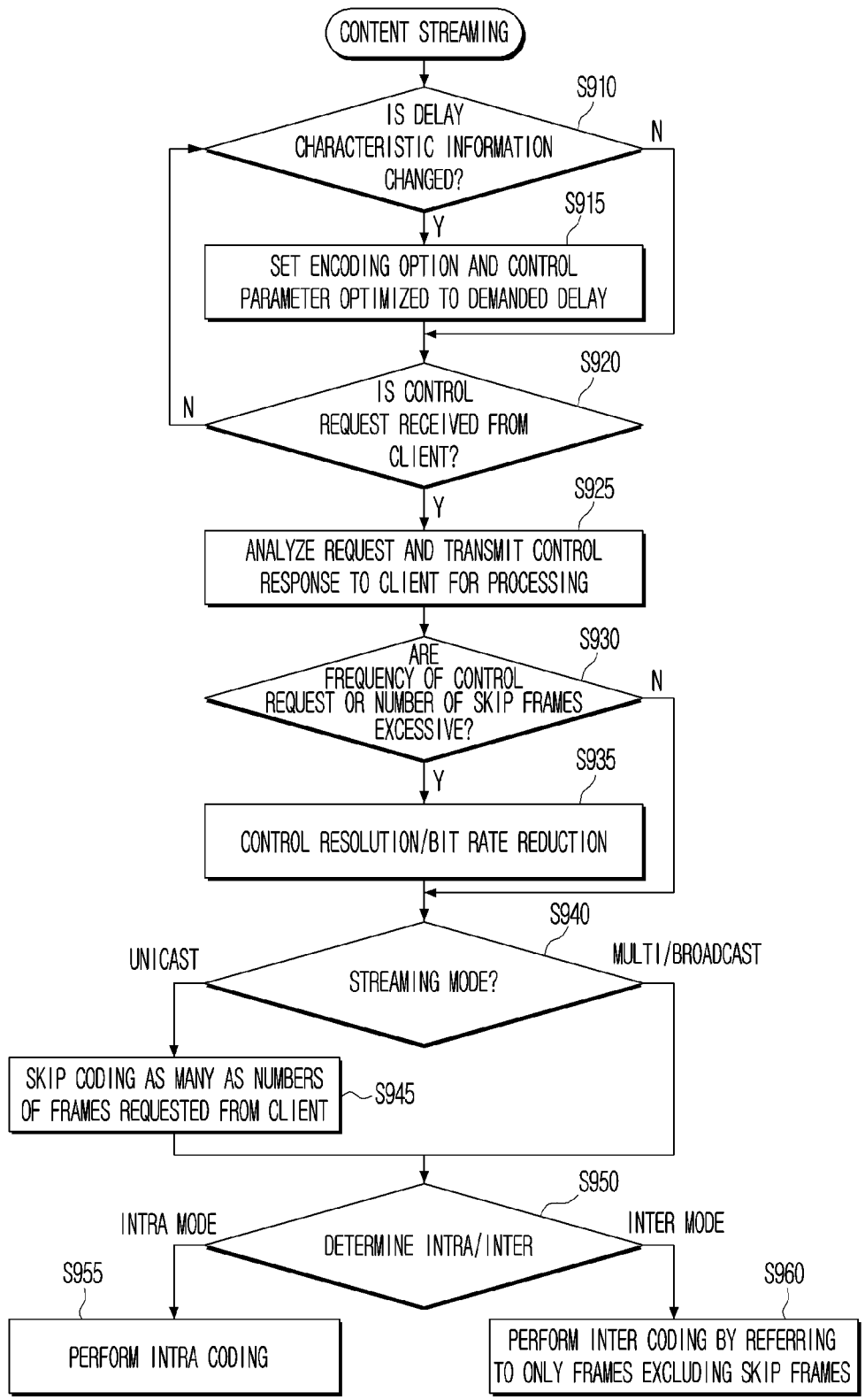
FIGS. 9, 10A, 10B, 10C and 10D include a flowchart and diagrams illustrating an encoding operation of a server apparatus according to various embodiments.

According to the embodiment of FIG. 9, the processor 230 may stream content in real time to the electronic apparatus 100 in operation S905.

The processor 230 may identify whether the delay characteristic information of the content is changed while the content is streamed in real time in operation S910.

In operation S915, the processor 230 may set an encoding option and/or a control parameter optimized for a demanded delay based on the delay characteristic information of the content when it is identified that the delay characteristic information of the content is changed in operation S910:Y.

When a control request is received from a client apparatus in operation S920:Y, the processor 230 may analyze/process the control request and transmit a control response to the client in operation S925. Here, the control request may be an encoding control request, and the encoding control request may include information on the number of frames to be skipped.

In the meantime, when the control request is not received from the client apparatus in operation S920:N, the processor 230 may identify whether the delay characteristic information is changed in operation S910.

In operation S935, the processor 230 may control the resolution and/or the compression bit rate of the content to be reduced if it is identified that the frequency of control request or the number of frames to be skipped from the client apparatus is excessive in operation S930:Y. Here, that the control request frequency being excessive denotes that the requests were greater than or equal to the critical number of times, and the number of frames to be skipped being excessive denotes that the number of frames is greater than or equal to the critical number. Here, the critical number of times and/or the critical number may be a preset value or a variable value according to content characteristics, delay characteristic information, and the like. That is, since the reception environment of the client apparatus is not good when the control request occurs frequently or the number of frames to be skipped is excessive, the processor 230 may control the ABR to lower the transmission amount, thereby minimizing/reducing the generation of transmission delay.

For example, the processor 230 may enable the encoder to perform skip directly or enable the decoder of the client apparatus perform skip as many as the number of frames in the control request, include the corresponding information in the control response, and transmit the response to the client apparatus. For example, the processor 230 may include corresponding information in a skip-flag in a control response. For example, if the current streaming mode is the unicast mode, performing the skip at the encoder reduces the transmission amount and reduces the operation of the decoder. Even in a multicast/broadcast mode, it may be advantageous to perform skipping at the decoder because there may also be other client apparatuses that enable encoder skip selection but does not require skipping. For example, consecutive frames or non-consecutive frames may be selected when a plurality of frames are skipped.

Accordingly, the processor 230 may identify a streaming mode in operation S940. When the streaming mode is identified as the unicast mode, the processor 230 may skip coding by the number of frames requested from the client apparatus in operation S945. However, when the streaming mode is identified as a multicast/broadcast mode, the processor 230 may not perform a coding skip by the number of frames requested from the client apparatus.

In addition, the processor 230 may identify whether to compress frames after frame skip generation to an intra mode in consideration of image quality and coding efficiency, or to an inter mode to compress only frames other than the skip frames in operation S950.

Figure 10A:
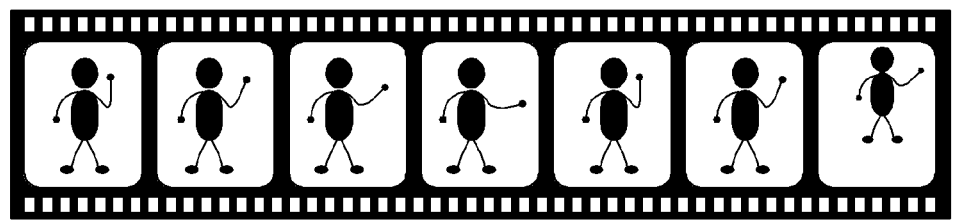
Figure 10B:
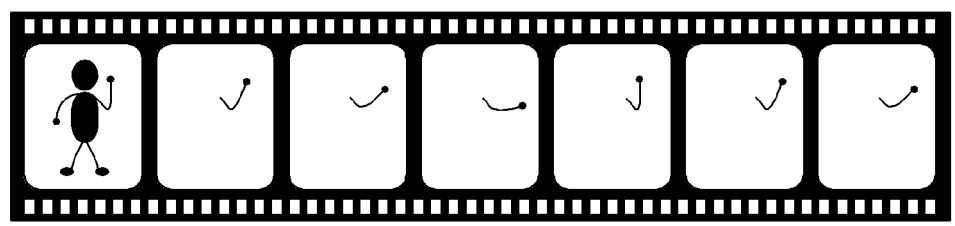
Figure 10C:
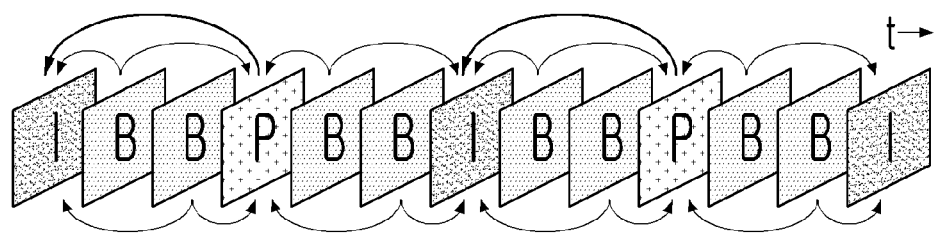

When it is identified that the encoding mode is an intra mode, the processor 230 may perform intra coding in operation S955, and when it is identified that the encoding mode is an inter mode, inter coding may be performed with reference to only frames excluding the frames to be skipped in operation S960. Here, the intra coding is a method of individually compressing every frame as shown in FIG. 10A, and the inter coding refers to a method of compressing several frames at once using similarity between adjacent frames as illustrated in FIG. 10B. A video compressed according to inter coding includes an inter-frame as shown in FIG. 10C, and the inter-frame compresses one or more pieces of information, and may refer, for example, to a bidirectional predictive frame (B) and a predictive frame (P) frame except for an I-frame. For example, assuming that the frames shown in FIG. 10C include one GOP, I and P frames may be first processed at the time of decoding, and then the B frame may be processed. Accordingly, the processor 230 may encode the B frame preferentially within one GOP. In addition, the processor 230 may encode other GOPs with a priority of I frame>P frame>B frame.

If a frame skip is performed at a decoder of a client apparatus according to an example, when performing inter coding using frames to be skipped in a decoder, decoding quality may be lowered by skipping corresponding frames in a decoder of a client apparatus. Accordingly, the processor 230 may perform inter coding with reference to only frames excluding frames to be skipped by the decoder of the client apparatus. Since the streamed content is transmitted in units of GOP, a frame to be skipped by the decoder may be identified in consideration of the GOP units. For example, the processor 230 may identify, as a skip frame, a frame excluding a frame to be referenced during decoding when the client apparatus receives and decodes the content in units of GOP units on the basis of the number of frames to be skipped, and transmit the information to the client apparatus.

Figure 10D:
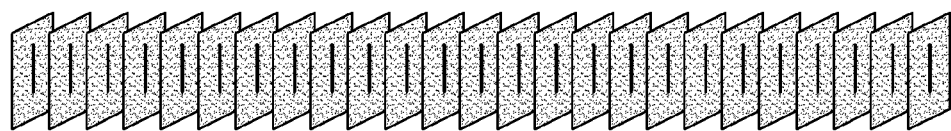

Meanwhile, in the intra mode, each frame may be individually compressed as an intra frame as shown in FIG. 10D, and thus any frame may be skipped. Accordingly, intra coding may be performed regardless of a frame to be skipped.

Figure 11:
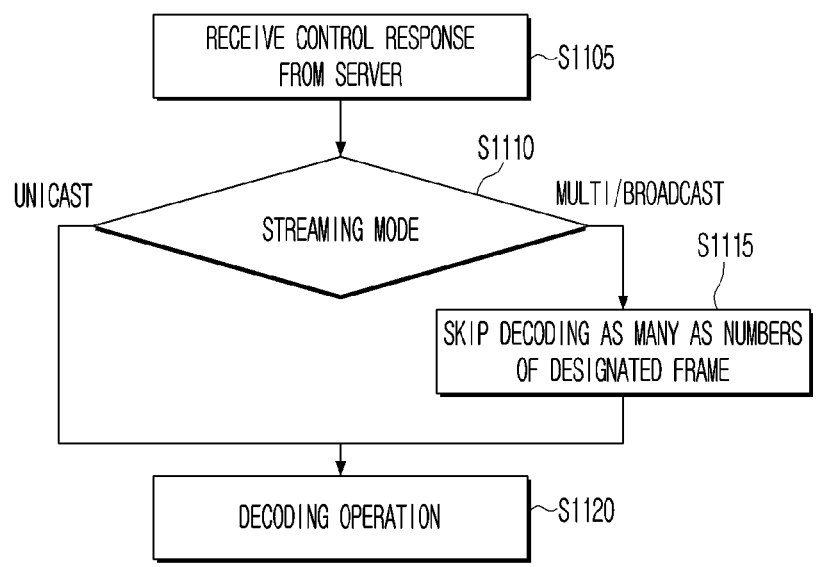
FIG. 11 is a flowchart illustrating an example decoding operation of an electronic apparatus according to various embodiments.

FIG. 11 is a flowchart illustrating an example decoding operation of an electronic apparatus according to various embodiments.

According to the decoding operation of the electronic apparatus 100 of FIG. 11, the electronic apparatus 100 (e.g., processor 140) may control the operation of the decoder based on the control response received from the server apparatus 200.

According to various embodiments, when a control response is received from the server apparatus 200 in operation S1105, the processor 140 may identify whether to skip a frame during decoding based on information included in the received control response. For example, the processor 140 may identify whether to perform skip on the basis of a skip-flag included in a control response in operation S1110. The server apparatus 200 may perform skip directly at an encoder or skip at a decoder of the electronic apparatus 100 according to a streaming mode. When the current streaming mode is the unicast mode, it is possible to reduce the transmission amount and reduce the operation of the decoder by performing a skip at an encoder. Even in a multicast/broadcast mode, because there may also be other client apparatuses that enable encoder skip selection but do not require skip, so it may be advantageous to perform skipping at the decoder. For example, consecutive frames or non-consecutive frames may be selected when a plurality of frames are skipped.

Accordingly, if it is identified that the decoder performs skipping by the decoder on the basis of the skip flag, the processor 140 may determine a decoding skip by the designated number of frames in operation S1115. For example, the control response may include whether to skip the decoder determined by the server apparatus 200 and position information of the frames to which the skip is applied. Meanwhile, a decoder of the electronic apparatus 100 may support a function of changing indexing for a reference frame in order to perform a frame skip, and support a function capable of controlling an output speed and/or a pause command of the display 120.

That is, when the streaming mode is a unicast mode, a frame skip has already been performed by the encoder of the server apparatus 200, so general decoding operation is performed, but when the streaming mode is a multicast/broadcast mode, the processor 140 may enable the decoder to perform a frame skip based on the information included in the control response in operation S1120.

According to various embodiments described above, it is possible to minimize and/or reduce a transmission delay while maintaining quality according to a network state and content characteristics in a low-delay streaming service such as real-time streaming. In addition, it is possible to recover to a minimum delay situation within a short time as much as possible when a delay occurs, prevent and/or reduce the accumulation of delays, and provide a viewing quality optimized for a specification of a user display.

Meanwhile, the methods according to various embodiments of the disclosure described above may be implemented in the form of an application that may be installed in an existing electronic apparatus. The methods according to various embodiments of the disclosure described above may be performed using a deep learning-based artificial neural network (or a deep artificial neural network), that is, a learning network model. According to various embodiments, at least one of downscaling, decoding, encoding, and upscaling may be performed through a trained neural network model.

The methods according to the various embodiments as described above may be implemented as software upgrade or hardware upgrade for an existing electronic apparatus.

The various embodiments described above may be performed through an embedded server provided in an electronic apparatus, or an external server of at least one electronic apparatus and a display device.

Meanwhile, various embodiments may be implemented in software, including instructions stored on machine-readable storage media readable by a machine (e.g., a computer). An apparatus may call instructions from the storage medium, and execute the called instruction, including an electronic apparatus (for example, an electronic apparatus A) according to the disclosed embodiments. When the instructions are executed by a processor, the processor may perform a function corresponding to the instructions directly or using other components under the control of the processor. The instructions may include a code generated by a compiler or a code executable by an interpreter. A machine-readable storage medium may be provided in the form of a non-transitory storage medium. Herein, the "non-transitory" storage medium is tangible, and may not distinguish the case in which a data is semi-permanently stored in a storage medium from the case in which a data is temporarily stored in a storage medium.

According to various embodiments, the method according to the above-described embodiments may be included in a computer program product. The computer program product may be traded as a product between a seller and a consumer. The computer program product may be distributed online in the form of machine-readable storage media (e.g., compact disc read only memory (CD-ROM)) or through an application store (e.g., PLAYSTORE™, APPSTORE™) or distributed online directly. In the case of online distribution, at least a portion of the computer program product may be at least temporarily stored or temporarily generated in a server of the manufacturer, a server of the application store, or a machine-readable storage medium such as memory of a relay server.

According to embodiments, the elements (e.g., module or program) described above may include a single entity or a plurality of entities. According to embodiments, at least one element or operation from among the corresponding elements described above may be omitted, or at least one other element or operation may be added. Alternatively or additionally, a plurality of components (e.g., module or program) may be combined to form a single entity. In this case, the integrated entity may perform functions of at least one function of an element of each of the plurality of elements in the same manner as or in a similar manner to that performed by the corresponding element from among the plurality of elements before integration. The module, a program module, or operations executed by other elements according to variety of embodiments may be executed consecutively, in parallel, repeatedly, or heuristically, or at least some operations may be executed according to a different order, may be omitted, or the other operation may be added thereto.

While various embodiments of the disclosure have been shown and described, the disclosure is not limited to the aforementioned specific embodiments, and it will be understood by one skilled in the art that various modifications may be made, without departing from the gist of the disclosure including the appended claims. Also, it is intended that such modifications are not to be interpreted independently from the technical idea or prospect of the disclosure. It will also be understood that any of the embodiment(s) described herein may be used in connection with any other embodiment(s) described herein.

What is claimed is:

1. An electronic apparatus comprising:
    a communication interface comprising communication circuitry;
    a display;
    memory configured to store at least one instruction; and
    at least one processor, comprising processing circuitry, operatively connected to the communication interface, the display, and the memory,
    wherein at least one processor is configured to execute the at least one instruction and to cause the electronic apparatus to:
        control the display to display content streamed from an external server via the communication interface,
        receive from the external server, via the communication interface, delay characteristic information corresponding to a type of the streamed content,
        based on the received delay characteristic information, identify a maximum critical size value of a stream buffer in which the streamed content is stored based on the delay characteristic information,
        based on identifying that the streamed content stored in the stream buffer exceeds the maximum critical size value, compare a maximum output speed of the display, maximum decoding speed of a decoder, and video frequency of the content,
        based on identifying that the maximum output speed of the display is greater than the video frequency of the content and the maximum decoding speed of the decoder is greater than the video frequency of the content, identify a remaining space size of the stream buffer,
        identify decoding speed, output speed of the display, and a position and number of frames to be skipped based on an output mode and the identified remaining space size, and
        control at least one of a frame output speed, frame output skip or frame interpolation skip based on whether adjustment of at least one of the decoding speed or the output speed of the display is possible.

2. The electronic apparatus of claim 1, wherein at least one processor is configured to cause the electronic apparatus to:
    identify a minimum critical size value of the stream buffer based on the received delay characteristic information,
    based on identifying that the streamed content stored in the stream buffer is less than the minimum critical size value, control at least one of a frame output speed, frame interpolation or frame repetition output based on a stream buffer state and the output mode,
    wherein the output mode comprises at least one of a variable refresh rate (VRR) mode, a frame rate control (FRC) mode, or a normal mode.

3. The electronic apparatus of claim 2, wherein at least one processor is configured to cause the electronic apparatus to:
    based on identifying that the streamed content stored in the stream buffer is less than a minimum critical value, identify a remaining spatial size of the stream buffer,
    identify a number and position of a frame to be added to the stream buffer based on the identified remaining space size, and
    control at least one of a frame output speed, frame interpolation or frame repetition output based on the output mode and the identified number and position of the frame.

4. The electronic apparatus of claim 1, wherein at least one processor is configured to cause the electronic apparatus to:
    based on adjustment of at least one of the decoding speed or the output speed of the display being possible, control the frame output speed based on the output mode or control frame interpolation skip, and
    based on adjustment of at least one of the decoding speed or the output speed of the display not being possible, control the communication interface to transmit, to the external server, an encoding control request comprising information about a frame to be skipped during encoding to control the frame output skip.

5. An electronic apparatus comprising:
    a communication interface comprising communication circuitry;
    a display;
    memory configured to store at least one instruction; and
    at least one processor, comprising processing circuitry, operatively connected to the communication interface, the display, and the memory,
    wherein at least one processor is configured to execute the at least one instruction and to cause the electronic apparatus to:
        control the display to display content streamed from an external server via the communication interface,
        receive from the external server, via the communication interface, delay characteristic information corresponding to a type of the streamed content,
        based on the received delay characteristic information, identify a maximum critical size value of a stream buffer in which the streamed content is stored based on the delay characteristic information,
        based on identifying that the streamed content stored in the stream buffer exceeds the maximum critical size value, compare a maximum output speed of the display, maximum decoding speed of a decoder, and video frequency of the content,
    wherein at least one processor is configured to cause the electronic apparatus to, based on identifying at least one of that, as a result of the comparison, the maximum output speed of the display is less than video frequency of the content and the maximum decoding speed of the decoder is less than video frequency of the content, control the communication interface to transmit, to the external server, an encoding control request comprising information on a frame to be skipped during encoding.

6. The electronic apparatus of claim 1, wherein at least processor is configured to cause the electronic apparatus to, based on transmitting an encoding control request to the external server, based on receiving, from the external server, a control response comprising information about whether decoding skip is performed and position information of a frame to which skip is performed, control a decoding operation of the streamed content based on the information included in the received control response.

7. A method of controlling an electronic apparatus, the method comprising:
displaying content streamed from an external server on a display;
receive from the external server, delay characteristic information corresponding to a type of the streamed content;
based on the received delay characteristic information, identifying a maximum critical size value of a stream buffer in which the streamed content is stored based on the delay characteristic information;
based on identifying that the streamed content stored in the stream buffer exceeds the maximum critical size value, comparing a maximum output speed of the display, maximum decoding speed of a decoder, and video frequency of the content;
based on identifying that the maximum output speed of the display is greater than the video frequency of the content and the maximum decoding speed of the decoder is greater than the video frequency of the content, identifying a remaining space size of the stream buffer;
identifying decoding speed, output speed of the display, and a position and number of frames to be skipped based on an output mode and the identified remaining space size; and
controlling at least one of a frame output speed, frame output skip or frame interpolation skip based on whether adjustment of at least one of the decoding speed or the output speed of the display is possible.

8. The method of claim 7, comprising:
identifying a minimum critical size value of the stream buffer based on the received delay characteristic information,
based on identifying that the streamed content stored in the stream buffer is less than the minimum critical size value, controlling at least one of a frame output speed, frame interpolation or frame repetition output based on a stream buffer state and an output mode,
wherein the output mode comprises at least one or a variable refresh rate (VRR) mode, a frame rate control (FRC) mode, or a normal mode.

9. The method of claim 8, comprising:
based on identifying that the streamed content stored in the stream buffer is less than the minimum critical size value, identifying a remaining spatial size of the stream buffer;
identifying a number and position of a frame to be added to the stream buffer based on the identified remaining space size; and
controlling at least one of a frame output speed, frame interpolation or frame repetition output based on the output mode and the identified number and position of the frame.

10. The method of claim 7, comprising:
based on adjustment of at least one of the decoding speed or the output speed of the display being possible, controlling the frame output speed based on the output mode or control frame interpolation skip; and
based on adjustment of at least one of the decoding speed or the output speed of the display not being possible, controlling a communication interface to transmit, to the external server, an encoding control request comprising information about a frame to be skipped during encoding to control the frame output skip.

11. The method of claim 7, comprising:
based on identifying at least one that, as a result of the comparison, the maximum output speed of the display is less than video frequency of the content and the maximum decoding speed of the decoder is less than video frequency of the content, transmitting, to the external server, an encoding control request comprising information on a frame to be skipped during encoding.

12. The method of claim 7, comprising:
based on transmitting an encoding control request to the external server, based on receiving, from the external server, a control response comprising information about whether decoding skip is performed and position information of a frame to which skip is performed, controlling a decoding operation of the streamed content based on the information included in the received control response.

* * * * *